United States Patent [19]

Schmunk

[11] 3,951,439

[45] Apr. 20, 1976

[54] MODULAR CELLULAR CONDUIT ASSEMBLY

[75] Inventor: John D. Schmunk, Findlay, Ohio

[73] Assignee: Hancor, Inc., Findlay, Ohio

[22] Filed: Oct. 7, 1974

[21] Appl. No.: 512,777

Related U.S. Application Data

[63] Continuation of Ser. No. 292,157, Sept. 25, 1972.

[52] U.S. Cl. .................... 285/137 R; 285/336; 285/365; 285/368; 285/423; 285/DIG. 4
[51] Int. Cl.² ......................................... F16L 39/00
[58] Field of Search .......... 285/137 R, DIG. 4, 386, 285/407, 365, 408, 367, 409, 366, 410, 372, 368, 373, 418, 419, 423, 424; 138/111, 115, 121

[56] References Cited
UNITED STATES PATENTS

| | | | |
|---|---|---|---|
| 899,623 | 9/1908 | Royer | 285/408 X |
| 2,563,366 | 8/1951 | Raymond | 285/387 |
| 3,305,249 | 2/1967 | Zahuranec | 285/137 R |
| 3,501,179 | 3/1970 | Boynton | 285/424 |
| 3,588,150 | 6/1971 | Wold | 285/423 |
| 3,747,632 | 7/1973 | Kok | 285/137 R X |

FOREIGN PATENTS OR APPLICATIONS

| | | | |
|---|---|---|---|
| 1,164,335 | 9/1969 | United Kingdom | 285/137 R |
| 492,923 | 3/1930 | Germany | 285/336 |

*Primary Examiner*—Dave W. Arola
*Attorney, Agent, or Firm*—Fay & Sharpe

[57] ABSTRACT

A modular assembly for constructing conduits of the type used for underground telephone lines, electrical lines, and the like. The specification discloses several embodiments each of which generally comprises a plurality of side-by-side corrugated plastic tubing sections. These sections are provided with laterally extending means which engage to prevent relative longitudinal movement between adjacent sections. Preferably, longitudinally spaced and circumferentially extending wrapping or binding members encircle the assembled section to prevent relative movement between the sections in the lateral direction. The specification and drawings also disclose several forms of joints for connecting aligned assemblies. In the preferred form, the joints include resilient foam members having spaced openings for receiving the aligned ends of the tubes in successive sections. Additionally, clamp means are provided for drawing the sections together to compress the foam members.

3 Claims, 21 Drawing Figures

MODULAR CELLULAR CONDUIT ASSEMBLY

This is a continuation of application Ser. No. 292,157, filed Sept. 25, 1972.

The subject invention is directed toward the conduit art and, more particularly, to an improved modular cellular conduit assembly comprised of a plurality of individual conduit members.

The invention is especially suited for use as underground conduit for telephone lines, electrical lines, and the like and will be described with particular reference thereto; however, it will be appreciated that the invention is capable of broader application and could be used for many different installations.

Currently, cellular conduits of the type used to protect underground cables for electrical service, telephone lines, etc., are manufactured from clay or concrete in a variety of sizes and with different numbers of cells. Generally, because of their weight, the conduits are made in relatively short lengths.

As can be appreciated, because of their weight and relatively short length, the problems involved in shipping and installing the conduits are substantial. Also, the conduits are generally limited to certain set numbers of cells which greatly reduces their flexibility.

The subject invention provides a modular cellular conduit construction which allows conduits having substantially any number of cells to be constructed rapidly and with a minimum of effort. In particular, according to the invention, the assembly comprises a plurality of side-by-side sections of corrugated plastic tubing provided with laterally interengaging portions for preventing relative longitudinal movement between the adjacent sections. Additionally, it is preferable that longitudinally spaced and circumferentially extending wrapping members encircle the sections to prevent relative movement between the sections in lateral directions.

The invention also contemplates that, preferably, but not necessarily, the sections are of regular polygonal cross-section and that the interengaging portions are comprised of cooperating recesses and protrusions formed on the outer surfaces of the sections. Also, it is desirable that each of the wrapping members be continuous about the sections.

As can be appreciated, the corrugated pipe sections can be made very light in weight and therefore of substantial length. Consequently, the number of joints in any installation can be greatly reduced as compared to prior installations. Further, the number of cells can be varied merely by varying the number of sections used. Additionally, the sections can be placed in bundles or stacks of varying cross-sectional configuration to meet the needs of any particular installation.

An additional advantage of the invention is that the corrugated pipe sections are individually flexible to further facilitate shipping and installation. However, when joined by the laterally interengaging portions and circumferential bands, the assembly is relatively rigid and will not shift.

A further aspect of the invention contemplates that the joints between successive bundles of the stacks will comprise resilient O-ring members positioned within the interior of each section adjacent the end and received within a corrugation. Preferably, smooth walled tube members having outer cross-section configurations corresponding to the internal cross-section of the sections are slidably received within the O-rings of each section to join aligned sections in successive bundles.

Alternately, the invention contemplates that the joints can comprise resilient foam members having spaced openings to receive the aligned ends of successive sections and clamp means for applying longitudinal forces to the successive sections to draw them together and compress the foam members. Preferably, the foam members are positioned between the end corrugations of the aligned sections.

A primary object of the invention is the provision of a method and apparatus for forming multi-cell conduits from corrugated plastic pipe.

A further object is the provision of a modular conduit construction particularly suited for forming multiple cell conduits for electrical service lines, telephone lines and the like.

Another object is the provision of a modular cellular conduit construction which permits a wide variation in the number of cells and their relative orientation.

Still another object is the provision of a conduit construction of the general type described which is easy to use and greatly simplifies installation of multiple cell conduits.

These and other objects and advantages will become apparent from the following description when read in conjunction with the accompanying drawings wherein.

Figure 1:
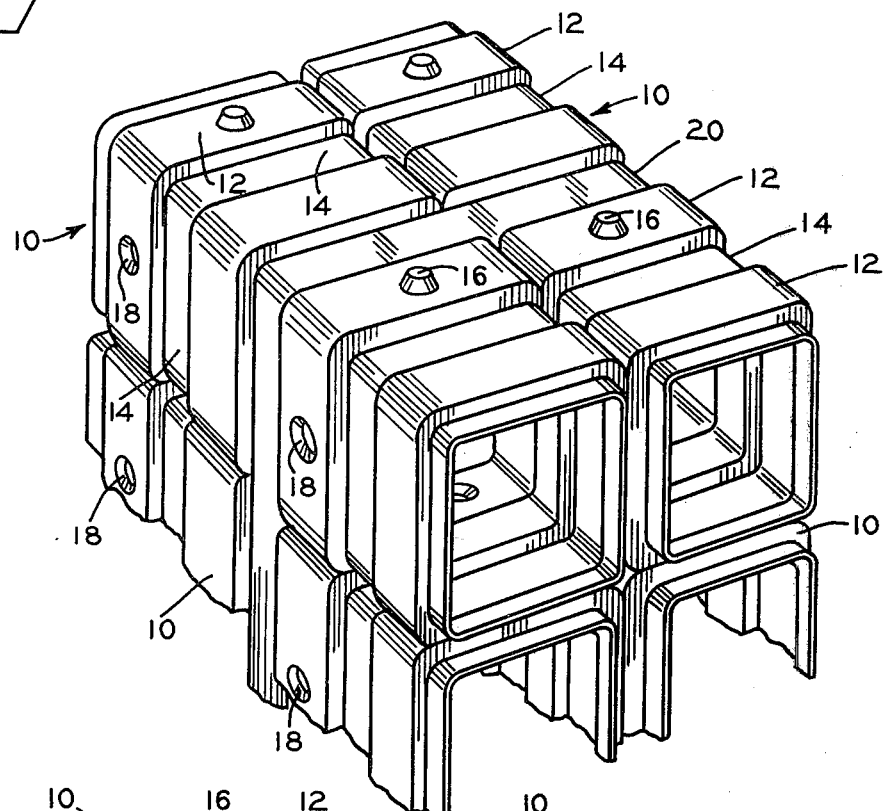
FIG. 1 is a partial pictorial view of a modular cellular conduit assembly formed in accordance with a preferred embodiment of the invention.
Figure 8:
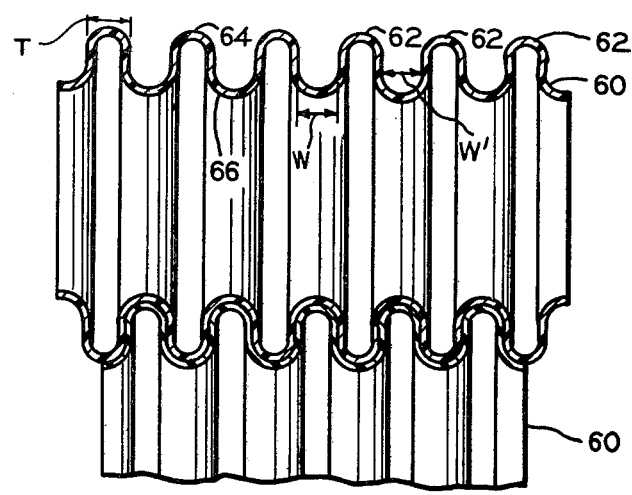
FIG. 8 shows a modified form of conduit member which can be used to form conduit assemblies in accordance with the invention.
Figure 9:
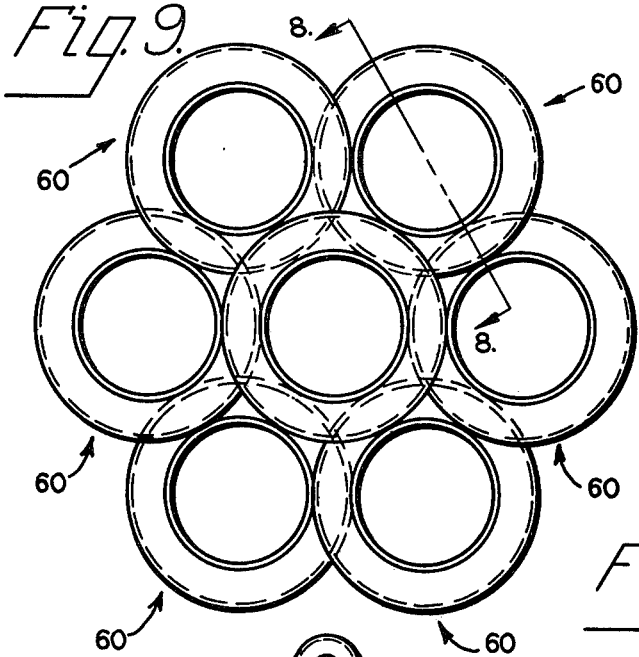
Figure 10:
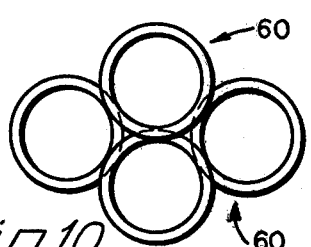
Figure 11:
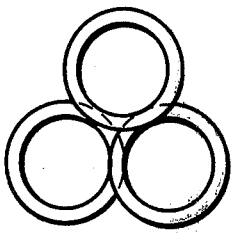
Figure 12:
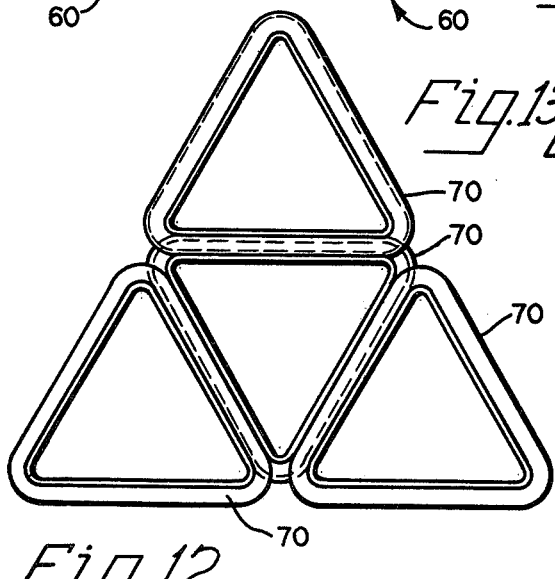
Figure 13:
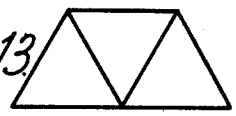
Figure 14:
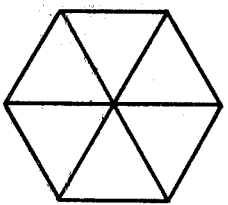
Figure 15:
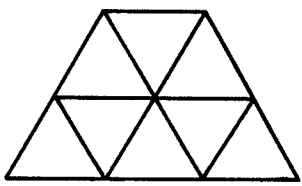
Figure 16:
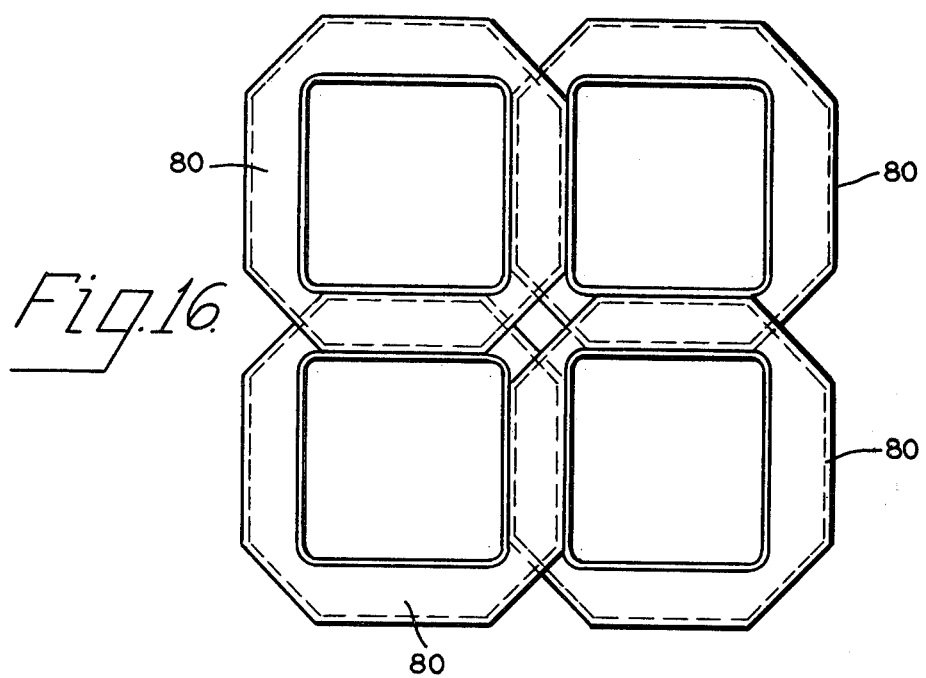
Figure 17:
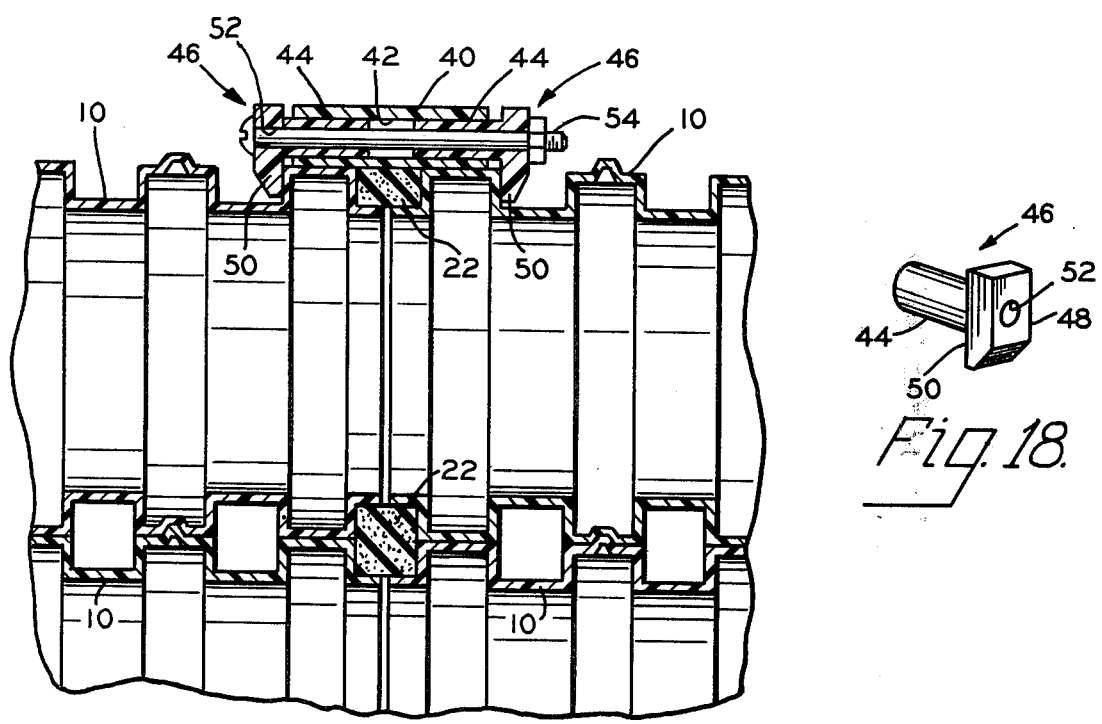
Figure 18:
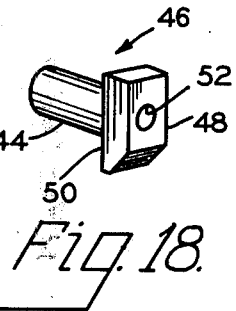
Figure 19:
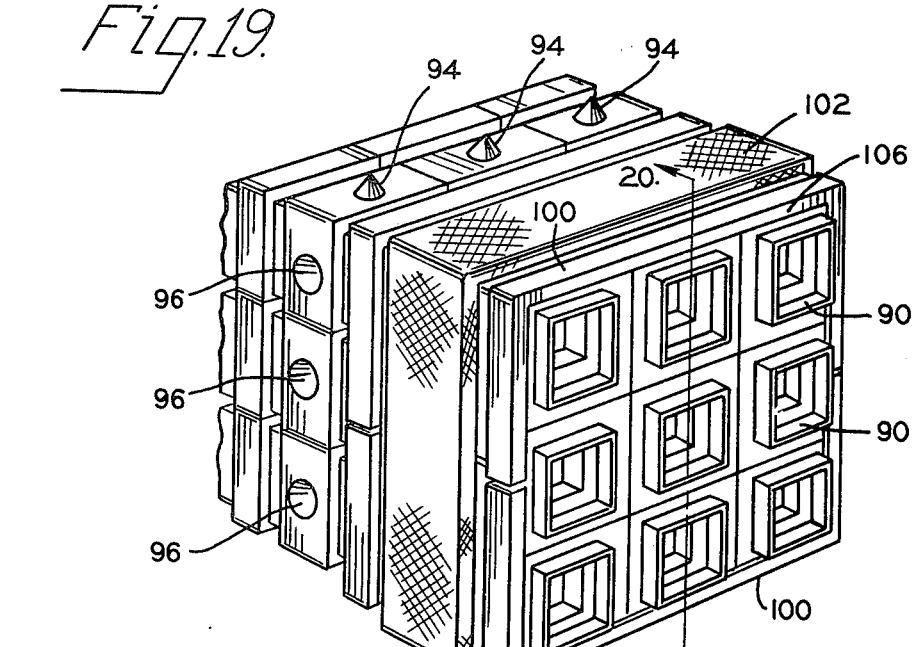
Figure 20:
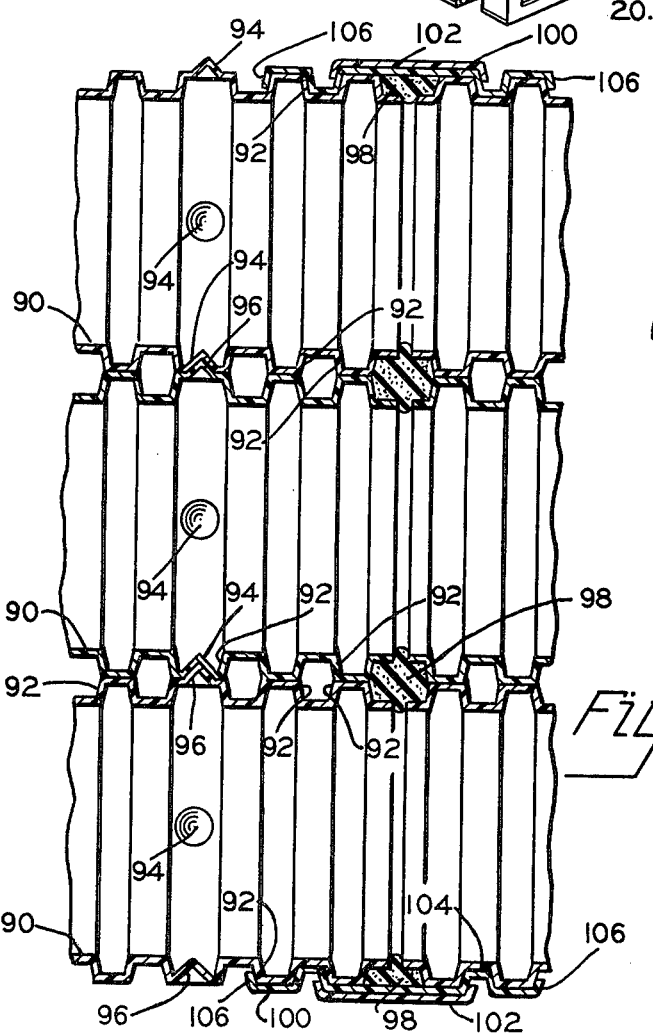
Figure 21:
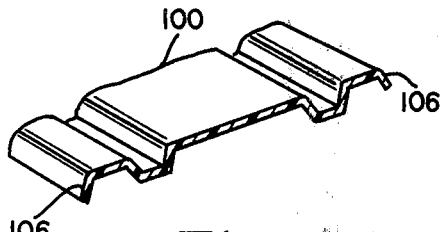

FIGS. 9 through 11 shown how the FIG. 8 modification can be used to form assemblies having a variety of different cross-sectional configurations and differing numbers of cells;

FIG. 12 shows a modified form of conduit which can be used to form multiple cell conduit assemblies;

FIGS. 13 through 15 illustrate different cross-sections possible with the conduits of the FIG. 12 embodiment;

FIG. 16 shows a modified form of the invention;

FIG. 17 shows a second modification of a connecting joint arrangement for joining the aligned conduit assemblies of the FIG. 1 embodiment;

FIG. 18 shows, in pictorial form, one of the connecting elements used in the FIG. 17 joint;

FIG. 19 is a pictorial view of a conduit assembly formed in accordance with a further modification of the invention;

FIG. 20 is a cross-sectional view taken on line 20—20 of FIG. 19; and,

FIG. 21 is a detail of one of the connecting elements used in the FIG. 19 embodiment.

Referring more particularly to the drawings wherein the showings are for the purpose of showing preferred embodiments of the invention only, and not for the purpose of limiting same, FIG. 1 illustrates a modular, multiple cell conduit assembly formed from a plurality of conduit members 10. Although it should be understood that the configuration of members 10 can be different in the embodiment shown, the assembly includes four structural identical conduit elements 10 arranged and innerconnected to define a four cell conduit assembly. As will become apparent hereafter, the particular number and arrangement of the conduit elements in any assembly can vary widely and the rectangular, four-cell arrangement has been shown merely for the purposes of illustration. Each of the conduit members 10 are preferably of identical construction and are shown as having a rectangular cross-section. Preferably, the conduit elements 10 are formed, for example, from relatively high density polyethylene by a continuous extrusion process of the type well known in the art.

The conduits shown are each provided with circumferentially extending corrugations 12 having a relatively rectangular cross-section. The outwardly extending corrugations 12 are innerconnected at their roots or base by planar portions 14.

Figure 2:
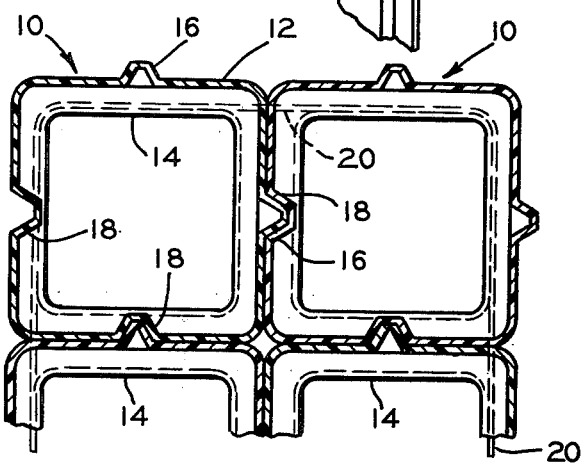
FIG. 2 is a transverse cross-section through a modular conduit assembly formed in accordance with the invention and showing the interengaging relationship of the individual conduit members.

To allow the individual conduits 10 to be assembled into a multiple cell conduit assembly, each of the conduits are provided with means for engaging adjacent conduits to prevent relative longitudinal movement. In the subject embodiment, the means comprise cooperating outwardly extending portions 16 and inwardly extending recesses 18. As best shown in FIG. 2, each of the conduit members 10 is provided along two adjacent faces with the outwardly extending portions 16 positioned at uniformly spaced points along the length of the conduit. On the other two faces, the conduits are provided with correspongingly located recesses 18. Although the outwardly extending portions and the recesses could have many different shapes and configurations, they are shown as being of a truncated, conical shape. Note that the exterior surface of the outwardly extending portions 16 is sized so as to be closely received within the recess portions 18.

In assembling a multiple cell conduit assembly, the conduits 10 are positioned to bring the outwardly extending portions 16 and the recesses 18 into engagement, as shown in FIG. 2. This prevents relative longitudinal movement between the conduits so long as they are maintained in proper lateral engagement. For this purpose, there is provided means in the form of circumferential wrapping bands 20 which extend completely about the assembled conduit members 10. The bands 20 are preferably positioned between adjacent corrugations 12 at longitudinally spaced points. The particular type of circumferential wrapping band utilized is not of importance to the invention. In the subject embodiment, the bands 20 merely comprise a flat metal strip which encircles the assembled conduits and is crimped or locked together at its overlapping end portions. Other types of circumferential wrapping or holding means could equally well be used.

Figure 3:
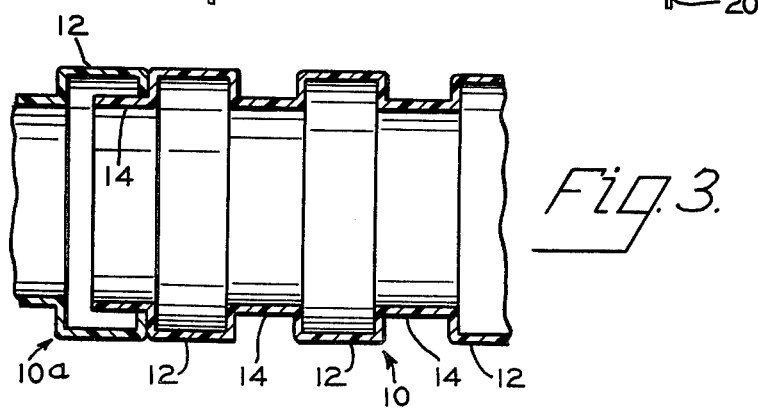
FIG. 3 is a longitudinal cross-sectional view through a joint between two mating conduit members.

As can be appreciated, the total number of cells provided in any assembly can be varied to meet the needs of a particular installation. Thus, although only four cells are shown in the FIG. 1 embodiment, any desired number could be provided merely by increasing the number of the members 10. Further, although by the use of relatively lightweight plastic conduit, the length of each conduit member can be relatively great, it is necessary in most installations to provide means to join the ends of the aligned conduit sections. Many types of joining means and arrangements can be provided depending upon the degree of sealing required. FIG. 3 shows a very simple slip joint-type arrangement which can be used when a good seal is not required. Note that a first conduit section 10 is joined to a second aligned conduit section identified as 10a by merely slipping the end of section 10a into the mating end of section 10a. Preferably, the section 10a is cut so that it terminates at the end of the end most corrugation 12 whereas the mating end of section 10 terminates at the end of the planar rib portion 14. When plastic pipe is used, the trimming of the ends to any desired length can be accomplished manually.

Figure 4:
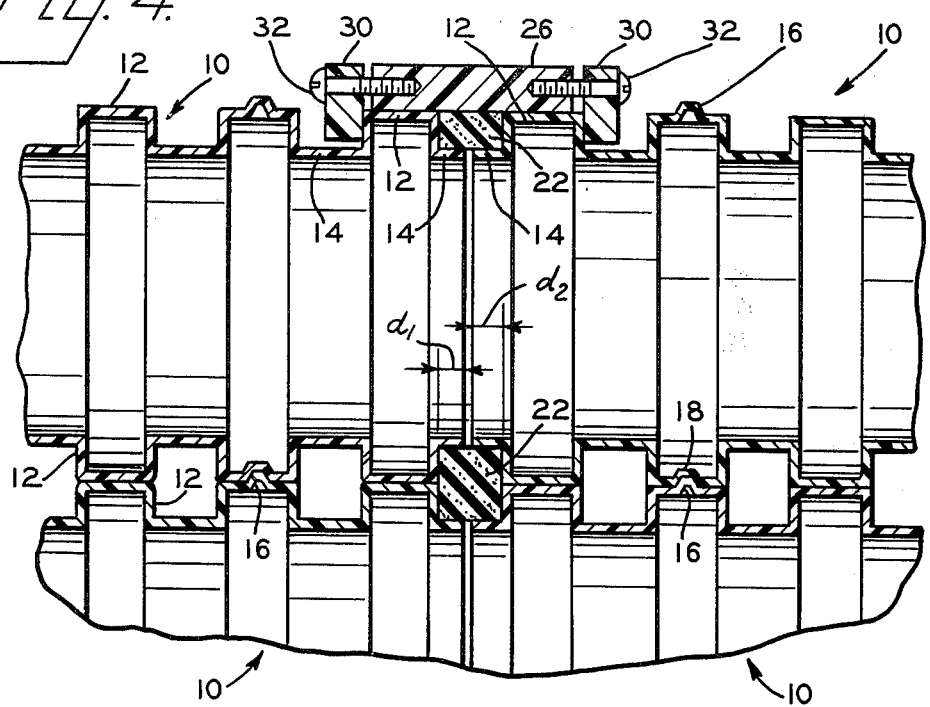
FIG. 4 is a longitudinal cross-section through a connecting joint between aligned conduit assemblies; and, FIGS. 5 through 7 are detailed pictorial views of components used in the joint of FIG. 4.
Figure 5:
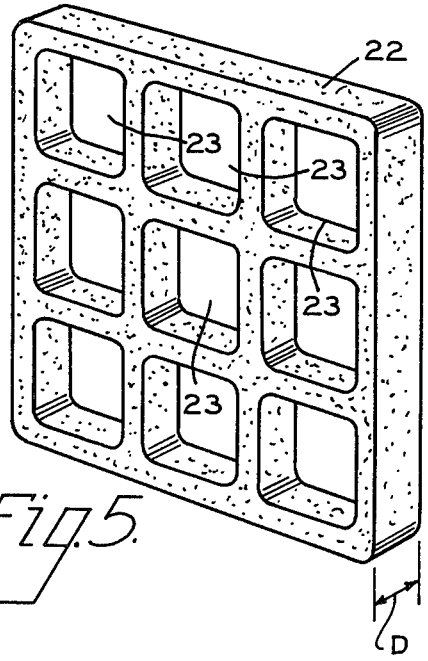
Figure 6:
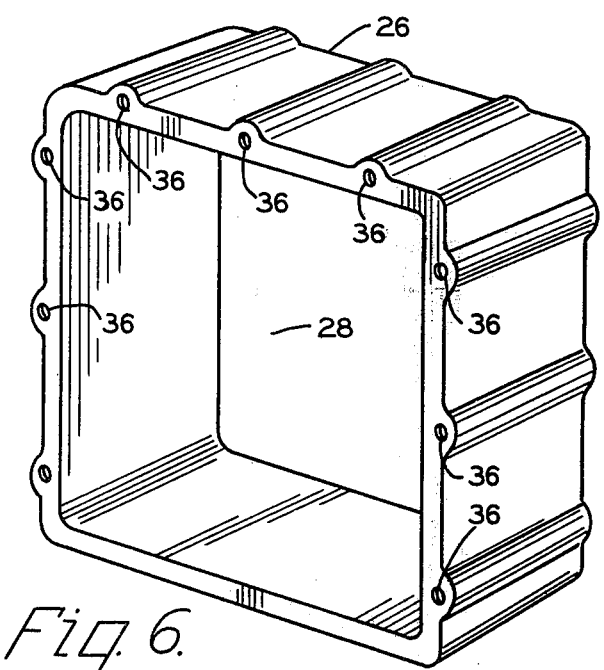
Figure 7:
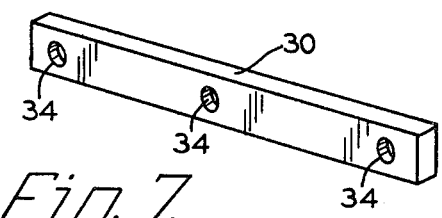

FIGS. 4 through 7 illustrate a preferred form of joint which can provide sealing against entry of soil into the conduit assembly and a degree of water sealing. As shown in FIG. 4; the abutting ends of the aligned conduit elements 10 are cut so that each end terminates in approximately a half length of the planar sections 14. A preformed member 22 of resilient material such as foam rubber, expanded polyurathane foam or the like is compressed between the aligned ends of the conduit members to provide a seal. The preformed member 22 is preferably illustrated in FIG. 5. Note that the member 22 is provided with central openings 23 sized so as to closely receive the ends of the conduits 10 in the manner illustrated in FIG. 4. It should be appreciated that the member 22 shown in FIG. 5 is particularly suited for a nine conduit assembly; however, the members can be made with any number of cell openings 23 so as to suit any particular installation requirements. Additionally, the members preferably have a thickness D which is slightly greater than the combined lengths D1 and D2 of the end portions of the abutting conduits. Thus, when positioned between the conduits, as shown in FIG. 4, a drawing together of the conduits causes the member 22 to be compressed into sealing engagement with the end surfaces of the conduits.

Many types of connecting arrangements could be used for applying the necessary clamping or compressing forces. In the subject embodiment, the means utilized comprise a continuous collar member 26 which is sized as to enclose the abutting ends of the aligned conduit assemblies. Note that the collar is shown in pictorial view in FIG. 6 and has an opening 28 sufficient to encompass nine of the conduit members. Preferably, the opening 28 is sized so as to closely receive the outer peripheral surface of the resilient member 22.

In assembling a joint, the collar 26 is normally slipped onto the end of one assembly prior to the insertion of the abutting conduits. After the conduits have all been placed in position, clamp plates 30 are positioned along the top and side edges in the manner shown in FIG. 4. Note that the clamp plates have depending portions which engage the walls of the end corrugations 12. Thereafter, screws 32 can be inserted through the openings 34 of the clamp plates 30 and threadedly received in the openings 36 formed about the collar 26. By tightening the screws 32, the clamp plates are caused to pull the conduits together producing a compression of the resilient member 22 and sealing the ends of the aligned conduits.

Clearly, many different types of connecting arrangements could be used to join the ends of the aligned conduits. FIGS. 17 and 18 illustrate a second embodiment of joint structure. Note that in this embodiment, the ends of the conduits 10 are received in a resilient member 22 of the type shown in FIG. 5. Additionally, a collar 40 extends completely about the ends of the aligned assemblies and has a structure generally similar to collar 26 illustrated in FIG. 6; however, the collar 40 is provided with larger diameter longitudinally extending openings 42 which slidably receive a cylindrical portion 44 of small clips or clamp members 46. As shown in FIG. 18, the clamp members 46 each include an outer generally rectangular end portion 48 having a downwardly extending clamp end 50. An opening 52 extends longitudinally through the cylindrical portion 44. In assembling the clamp members 46 into the collar members 40, the cylindrical portions 44 are merely inserted into the openings 42 at opposite sides. The members are then rotated to bring the clamp surface or portion 50 into engagement with the walls of the end corrugations 12. A bolt or the like 54 can then be inserted through the aligned openings 52 and a nut attached to clamp the clamp members 46 into engagement with the tube ends and to draw them tightly together to compress the resilient member 22.

It should be appreciated that the particular number of clamping members provided can vary depending upon the size and/or loads applied to the conduits. Additionally, rather than using collars such as collars 26 and 40, individual connecting elements can be provided.

FIGS. 8 through 16 show modified forms of the invention. In these embodiments, it is not necessary to provide the circumferential wrapping straps, although they can be used. As shown in FIGS. 8 and 9, this assembly includes a plurality of conduit members 60 which are shown as having a generally circular cross-section. The conduits 60 are corrugated throughout their lengths and arranged so that the corrugations provide an innerlocking effect between adjacent conduits. In particular, it will be noted that the corrugations 62 each have a uniform thickness T which terminates in a circular outer end portion 64. The root portions 66 which innerconnect adjacent corrugations 62 are similarly arranged and have a width W which is substantially equal to the thickness T of the corrugations. Preferably, the juncture between the root portions and the outer portions 62 is of a width W1 which is slightly less than T. This allows the adjacent conduits 60 to be snapped together as shown in FIG. 8. The corrugations thus serve to positively innerlock the conduits. The conduits can be arranged in substantially any desired arrangement to provide a multiplicity of differing cross-sections and assemblies having different numbers of cells. For example, FIG. 9 shows a seven cell arrangement, and FIGS. 10 and 11 respectively, show how the conduits may be arranged for four and three cell assemblies.

The embodiments of FIGS. 12 through 15 use the same principle as described with reference to FIGS. 8 through 11. In particular, the conduits 70 are provided with cooperating corrugations which allow them to be snapped together in the manner described with reference to FIGS. 8 and 9. The difference between the embodiment of FIGS. 12 through 15 and that described in FIGS. 8 and 9 is the cross-sectional shape of the conduit members. Note that in this embodiment the conduits are provided with a cross-section of equilateral triangular shape. This allows a multiplicity of different assembly shapes to be provided as shown in FIGS. 13 through 15.

In the FIG. 16 embodiment, the conduit elements 80 are similarly provided with innerlocking corrugations but have a generally square cross-section. Many other types of cross-sectional shapes could be provided if desired. Additionally, it should be understood that the conduits of any of the embodiments can be innerconnected in the same general manner as described with reference to FIGS. 4 and 17. Also, depending upon the structural strength required, circumferential wrapping members can be utilized to maintain the conduits in proper relative relationship. FIGS. 19 through 21 show an additional embodiment of the invention which is formed generally in the manner discussed with reference to FIGS. 1 through 7. As best shown in FIGS. 19 and 20, the assembly comprises nine conduit members 90 each having a generally rectangular cross-section and provided with circumferential corrugations 92 at spaced points along their lengths. In this embodiment, certain of the corrugations 92 are somewhat wider than the remaining corrugations and are formed with cooperating extensions or protusions 94 and recesses 96. Thus, as the individual conduit members 90 are assembled in the manner shown, the protusions 94 mate with the recesses 96 to provide interlocking and prevent relative longitudinal movement.

Although not shown in FIGS. 19 and 20, it is to be understood that circumferential wrapping bands, such as band 20 in FIG. 1, can be added to the assembled conduits to prevent lateral movement. Additionally, and in accordance with a preferred aspect of the invention, the joint between successive aligned conduits is arranged to prevent both longitudinal and lateral movement between the assembled conduit members. As best shown in FIGS. 19 and 21, the joint includes a resilient precut foam member 98 adapted to receive the ends of the aligned conduits. The member 98 is formed as discussed with reference to member 22 of FIG. 5. A cap band member 100 is associated with each joint and arranged to compress the foam member 98 to seal the joint. As best shown in FIG. 21, the cap band member 100 is formed from two half sections which are arranged to encompass one-half of the total conduit assembly. The mating or abutting ends of the half sections are joined through the use of plastic tape or the like after they have been positioned on the assembly. In the embodiment under consideration, short sections of the plastic tape 102 are bonded to the outer surface of the cap band members to firmly lock them in position on the assembly. It will be noted in FIG. 20 that the cap band members have a cross-section or shape to engage in the end corrugations of the conduits. Note that an inwardly extending portion 104 is adapted to mate between the two end corrugations 94 of each of the aligned end conduits. An end flange portion 106 is provided at each lateral side of the band halves and extends over the second corrugation. Because of the incline of the corrugation wall, the positioning of the cap bands applies a longitudinal wedging action to the joint to pull the aligned conduits together. Additionally, this serves to longitudinally compress the precut resilient member 98.

What is claimed is:

1. A joint assembly connecting the ends of aligned bundles of corrugated tubes in which each of the tubes have an exterior surface defined by alternate peaks and valleys which are circumferentially extending, comprising a resilient compressible member having a plurality of openings therein receiving the opposed ends of the corrugated tubes of each bundle, said openings being smaller than the maximum cross-sectional dimension of the tubes, a sectional cap member means receiving the ends of each bundle and having grooves thereon receiving and engaging the end corrugation of the outermost tubes in each bundle, said grooves being spaced a distance and having complementary shapes with the corrugations such as to cause the ends of the bundles to be drawn together to compress said compressible member when said cap member means are moved relative to each other, and means joining the sections of the sectional cap member to provide a unitary structure.

2. The joint assembly as described in claim 1 wherein the means joining the sections of the sectional cap member comprises a band member for encircling said sections.

3. The invention as described in claim 1 wherein said resilient compressible member has a number of openings equal to the number of aligned tubes in each bundle and wherein said sectional cap member fits within said band member.

* * * * *